L. L. WHITE.
FLOAT OPERATED INDICATOR AND ENGINE CONTROL.
APPLICATION FILED MAY 12, 1916.
1,243,470.
Patented Oct. 16, 1917.
2 SHEETS—SHEET 1.
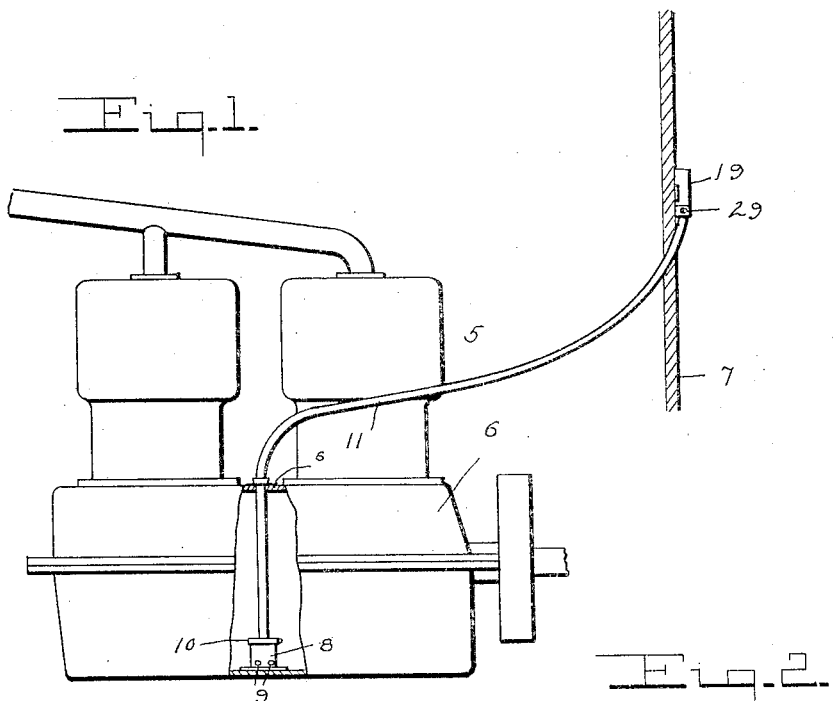
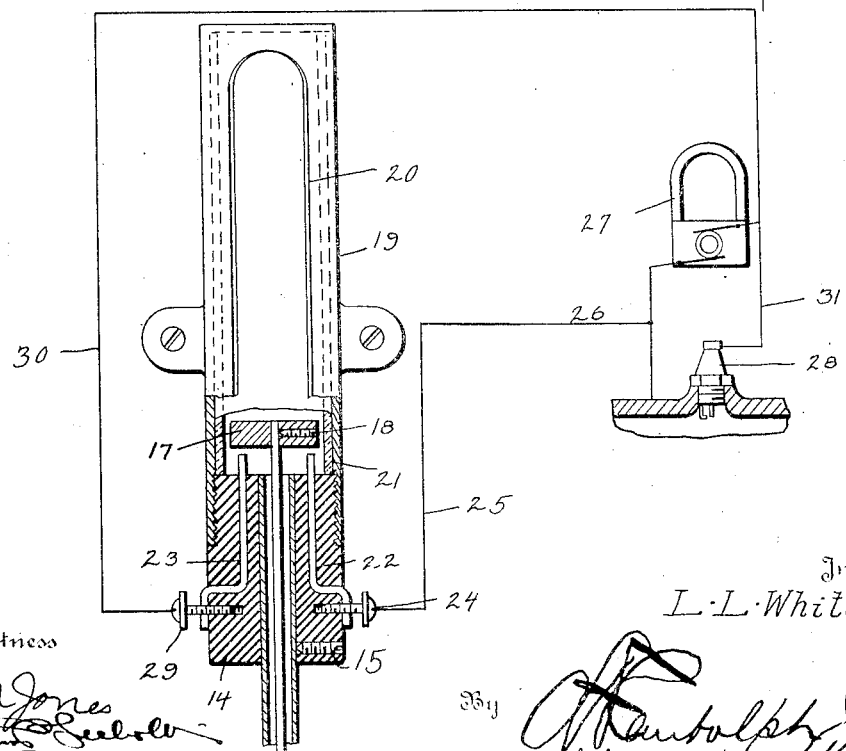
Inventor
L. L. White

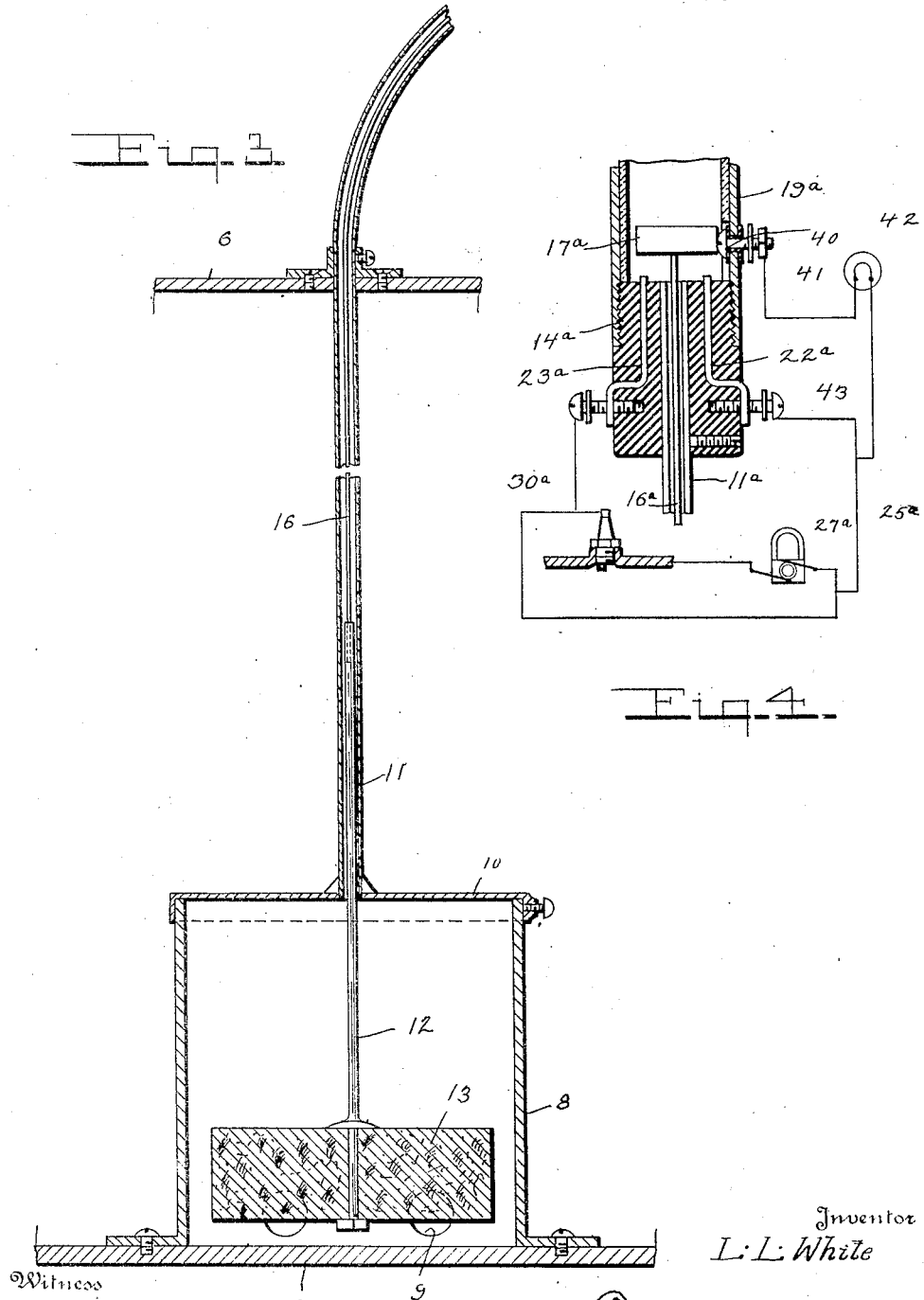

UNITED STATES PATENT OFFICE.

LEROY L. WHITE, OF SPOKANE, WASHINGTON, ASSIGNOR OF ONE-HALF TO GEORGE G. BELDEN, OF SPOKANE, WASHINGTON.

FLOAT-OPERATED INDICATOR AND ENGINE CONTROL.

1,243,470.  Specification of Letters Patent.  Patented Oct. 16, 1917.

Application filed May 12, 1916. Serial No. 97,150.

*To all whom it may concern:*

Be it known that I, LEROY L. WHITE, a citizen of the United States, residing at Spokane, in the county of Spokane and State of Washington, have invented certain new and useful Improvements in Float-Operated Indicators and Engine Controls; and I do hereby declare the following to be a full, clear, and exact description of the invention, such as will enable others skilled in the art to which it appertains to make and use the same.

This invention relates to a combined oil indicator and controlling device for explosive engines and is particularly designed for use in connection with motor vehicles, but is not necessarily limited to such use.

The invention has for its object to provide an indicator including a float actuated by the oil contained in the crank case of the engine and controlling an indicating device located upon the dash or other part of the vehicle.

Another object is the provision of means associated with the dash-carried indicator for automatically short circuiting the ignition system of the engine, and causing the latter to cease to operate.

With these and other objects in view, the invention consists in the novel construction, combination and arrangement of parts as will be hereinafter specifically described, claimed and illustrated in the accompanying drawings, in which:

Figure 1 represents a fragmentary side elevation of an explosive engine and vehicle dash, illustrating the improved indicator applied thereto, Fig. 2 represents a front elevation, partly in section, of the dash supported part of the indicator, Fig. 3 represents a fragmentary sectional view through the crank case of the engine, illustrating the float in detail, and Fig. 4 represents a fragmentary sectional view through a modified type of the indicator.

Referring to the drawings in detail, wherein similar reference numerals designate corresponding parts throughout the several views, the numeral 5 indicates generally an explosive engine of a well known type including the crank case 6 adapted to contain a quantity of lubricating oil to lubricate the working parts of the engine during operation. The numeral 7, in Fig. 1, indicates a fragment of a dash-board or other part of a motor vehicle, which is utilized for supporting a part of the improved indicator.

A hollow cylindrical housing 8 is rigidly secured to the bottom of the crank case 6 and is formed in its lower portion with ports 9 adapted to permit the lubricant contained in the lower part of the crank case to enter the housing. The upper terminal of the housing is closed by a removable cap 10 with which is connected a flexible tubular guide 11, receiving the rod 12 carried by a float 13, which latter is movable vertically within the housing 8 and is adapted to float upon the surface of the oil contained in the crank case. The tubular guide 11 extends upwardly through the top of the crank case 6 and rearwardly of the motor vehicle through an opening formed in the dash 7, the rear terminal of the guide being secured in an insulator 14 by a set screw 15. The upper terminal of the rod 12 is connected with a flexible wire or cable 16, which extends through the guide 11 and is connected at its opposite terminal with an indicator block 17 by a set screw 18. The block 17 is movable vertically within a tubular housing 19 secured to the rear face of the dash 7 and is formed in its front with a vertically elongated slot 20, a transparent protecting tube 21 being preferably arranged in the housing 19 to prevent dust and dirt entering the slot 20. As the float 13 floats upon the surface of the lubricant contained in the crank case 6 the movement thereof is transmitted through the rod 12 and cable 16 to the indicator block 17, which latter is visible through the transparent tube 21 in order to permit the operator of the vehicle to readily determine the quantity of oil in the crank case.

A pair of contact members 22 and 23 are anchored in the insulator 14, project above the upper end of the latter and are adapted to be engaged by the indicator block 17 when the latter is in its lowermost position, said indicator block being constructed of conducting material so as to electrically connect the contacts 22 and 23. A binding post 24 is secured in the insulator 14 and is electrically connected with the contact 22 and is connected by a conductor 25 with the ground wire 26 of the ignition system of the engine 5, which latter includes a high tension magneto 27 and the usual spark plug 28. The other contact 23 is electrically connected with a binding post 29, which latter is connected by a conductor 30 with the other wire 31 of the ignition system.

From the foregoing it is clearly evident that should the operator of the vehicle not take the warning given by the position of the block 17 in the housing 19, said block when the oil in the crank case becomes dangerously low is moved against the contacts 22 and 23, thereby short circuiting the ignition system of the vehicle through the conductors 25 and 30, contacts 22 and 23 and block 17, and causing the engine to cease operating.

In the modification of the invention illustrated in Fig. 4 the tubular housing 19ª of the dash carried indicator is provided with an insulator 14ª in its lower terminal in which is secured the upper terminal of the flexible guide 11ª, receiving the cable 16ª carrying the indicator block 17ª. Contacts 22ª and 23ª are anchored in the insulator 14ª and are adapted to be engaged by the block 17ª when the latter is in its lowermost position to short circuit the ignition system of the engine through the conductors 25ª and 30ª. In this type of the indicator a contact member 40 is secured within the housing 19ª above the upper terminals of the contacts 22ª and 23ª and is adapted to be engaged by the vertically movable block 17ª to complete a circuit from the grounded side of the magneto 27ª through the engine, housing 8, tubular guide 11, cable 16, block 17ª, contact 40, conductor 41 to one pole of an indicator lamp 42, which is preferably arranged in a conspicuous position upon the dash 7 of the vehicle. The opposite pole of the lamp 42 is electrically connected with the conductor 25ª of the magneto 27ª by a branch conductor 43.

By placing the float 13 within the crank case of the engine it is effectively protected and is actuated by the same body of oil which is used in lubricating the engine, thus insuring a constant circulation of oil over the float and through the float housing 8. It is also evident that the interior of the tubular guide 11 is thoroughly lubricated by fresh oil from the crank case, thus insuring free movement of the flexible wire or cable 16 through the guide. As clearly shown in Fig. 1, the float housing 8 is comparatively low while the tubular guide 11 is of comparatively small diameter, thus economizing in the space occupied by the indicator in the crank case.

What I claim is:

1. In combination, an explosive engine including an oil containing crank case and an ignition system, a float arranged in the lower portion of said crank case adapted to float upon the oil contained therein, a flexible cable connected with said float, a housing adapted to be secured upon a support removed from said engine and receiving the opposite terminal of said flexible cable, an insulator secured in the lower terminal of the last-mentioned housing slidably receiving said flexible cable, a conducting block connected with said cable and movable vertically within the last-mentioned housing, and a pair of contacts anchored in said insulator, arranged in the circuit of said ignition system and adapted to be engaged by said block to short circuit the ignition system of the engine.

2. In combination, an internal combustion engine including an oil containing crank case, a housing arranged in said crank case, a float movable vertically within said housing and adapted to float upon the surface of the oil contained in said crank case, a flexible cable connected with said float and extending interiorly of said crank case, a housing adapted to be supported at a point removed from said engine and receiving the opposite terminal of said flexible cable, an insulator secured in the lower terminal of the last-mentioned housing movably receiving said cable, a pair of contacts anchored in said insulator and connected in circuit with the ignition system of said engine, a conducting block carried by said cable adapted to engage said contacts to short circuit the ignition system of said engine, an electric indicator lamp, and means controlled by said block for closing the circuit to said lamp.

3. In combination, an explosive engine including an oil containing crank case, a housing arranged in the bottom of said crank case and having oil ports in the lower portion thereof, a float movable vertically within said housing, a tubular guide connected with and of less diameter than said housing and extending exteriorly of said crank case, a flexible cable connected with said float and extending through said guide, and an indicator operable by said flexible cable.

4. In combination, an explosive engine including an oil containing crank case, a housing supported in said crank case having supports therein, a tubular guide communicating with said housing and extending exteriorly of said crank case, a float movable vertically within said housing, a flexible cable connected with said float and extending through said guide, and an indicator connected with said cable.

5. In combination, an explosive engine including an oil-containing crank case, a float arranged in said crank case and adapted to float upon the surface of the main body of oil contained therein, a housing arranged in the bottom of said crank case and inclosing and constituting a guide for said float, and an indicator connected with said float.

In testimony whereof I affix my signature in presence of two witnesses.

LEROY L. WHITE.

Witnesses:
H. C. KINZEL,
E. E. SWAN.